United States Patent
Vlahos et al.

(10) Patent No.: US 6,538,396 B1
(45) Date of Patent: Mar. 25, 2003

(54) AUTOMATIC FOREGROUND LIGHTING EFFECTS IN A COMPOSITED SCENE

(75) Inventors: Paul Vlahos, Tarzana, CA (US); Allen Dadourian, Northridge, CA (US); Joseph T. Parker, Los Angeles, CA (US); Petro Vlahos, Redway, CA (US)

(73) Assignee: Ultimatte Corporation, Chatsworth, CA (US)

( * ) Notice: Subject to any disclaimer, the term of this patent is extended or adjusted under 35 U.S.C. 154(b) by 0 days.

(21) Appl. No.: 09/963,147

(22) Filed: Sep. 24, 2001

(51) Int. Cl.[7] .................................................. H04N 9/74
(52) U.S. Cl. ........................................ 315/292; 348/586
(58) Field of Search ................................ 315/292, 293, 315/294, 295; 348/586, 169

(56) References Cited

U.S. PATENT DOCUMENTS 5,343,252 A * 8/1994 Dadourian .................. 348/586

* cited by examiner

*Primary Examiner*—David Vu
(74) *Attorney, Agent, or Firm*—Blakely Sokoloff Taylor & Zafman

(57) ABSTRACT

A method for automatically implementing and coordinating the techniques of creating the illusion of illumination changes on a foreground subject that should occur when the subject moves throughout the various illumination levels on the background of a composite image.

12 Claims, 5 Drawing Sheets

AUTOMATIC FOREGROUND LIGHTING EFFECTS IN A COMPOSITED SCENE

FIELD OF THE INVENTION

The invention is in the field of compositing methods and devices used to create composite images by combining a background scene and a foreground subject.

BACKGROUND OF THE INVENTION

A blue screen composite-image process starts with a foreground subject in front of a blue or green backing. The process is most often called "Blue Screen", or "Chroma Key". The blue backing is replaced with a desired background scene as a result of a compositing process.

The incident lighting on the blue backing, which includes a blue floor, must be uniform because its level controls the observed level of the background scene in the composite image. The uniform lighting of the blue set includes uniform lighting of the foreground subject since the same lamps that light the backing generally illuminate the subject.

Illumination on the background scene may or may not be uniform. An example of non-uniform illumination is a background scene consisting of a room illuminated by a few overhead lamps. The light at the floor is therefore uneven with darker areas between lamps. The subject composited into such a background scene, when approaching an area close to an overhead lamp should show an increased illumination to provide a sense of realism, which it currently does not.

Foreground subjects composited against a computer-generated virtual background face the same problems as subjects composited against a background set constructed of plywood flats, wallpaper and paint. Lighting effects in the background have not been employed in either case. There has been no practical method for creating matched lighting effects for both background and foreground scenes that are being composited in real-time.

SUMMARY OF THE INVENTION

This invention automatically alters the apparent illumination level of the subject by varying the subjects RGB levels in a composite image when the subject appears to visit various areas in the background scene that have different illumination levels. When the subject enters such an area, the invented compositing device and methodology will automatically adjust the RGB levels of the foreground subject to a level that would have resulted if the scene had been real.

DETAILED DESCRIPTION OF THE INVENTION

Figure 1:
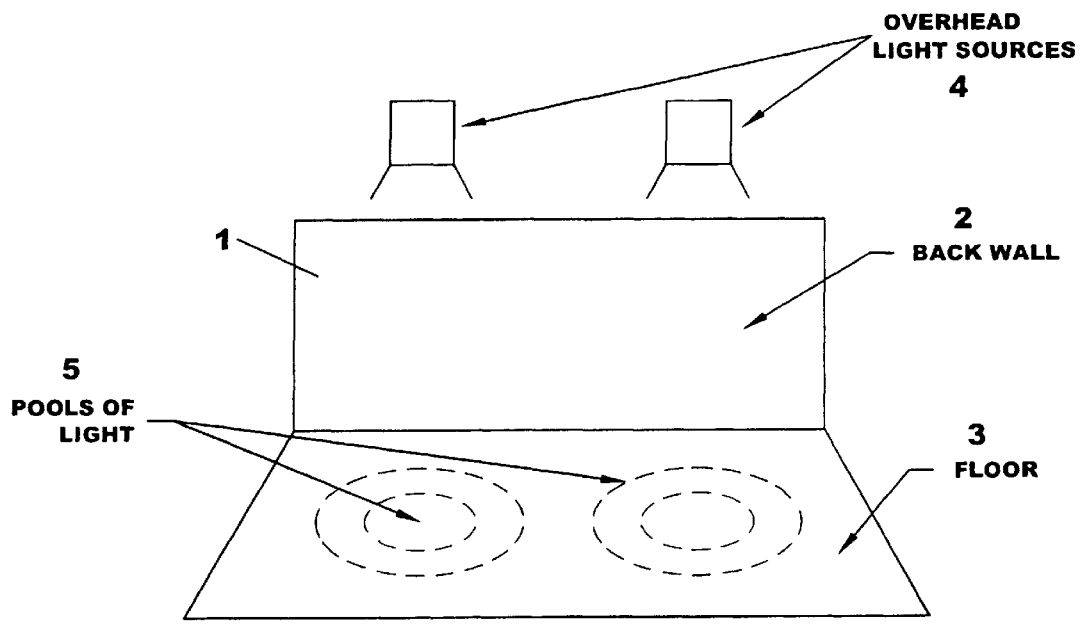
FIG. 1 shows a background scene in which the floor is illuminated by a few overhead lamps that are far enough apart to result in light and dark areas on the floor.

Referring to FIG. 1, when a person walks on a real set 1, consisting of a back wall 2 and a floor 3, this person will be lit by the same overhead light sources 4 that are illuminating the set. These overhead lights 4 will create pools of light 5 on the floor, so that when the person walks under the bright lights, he will receive a greater illumination than when he walks away from the direct light into the darker parts of the floor.

Figure 2:
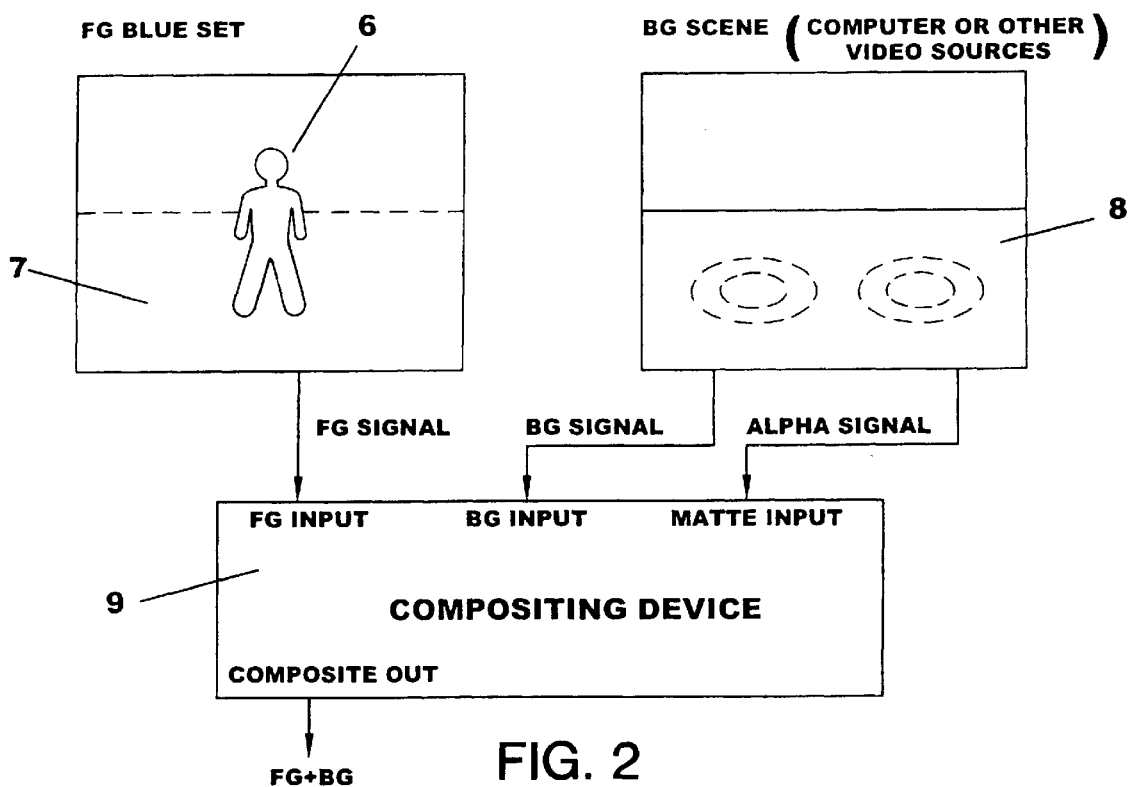
FIG. 2 is a diagram of the compositing system showing the connections of the components and examples of the corresponding video outputs.

Referring to FIG. 2, the subject 6, when walking on the blue stage 7, will appear to be walking on the floor of the background 8 in the composite. When the subject appears to walk under an overhead lamp we expect him to receive a greater illumination. We also expect to see the subject progressively darken when walking into a dark area between lamps.

The relative illumination level received by various areas in the background can be determined from the resulting luminance of the background floor. The floor luminance level may then be scaled to control the level of the foreground subject so that the subject appears to have received the same illumination as the background area he appears to occupy.

The reflected RGB levels of the floor, being proportional to the incident illumination, constitute the luminance and color of the floor. Because the floor in the background scene is a flat continuum, its reflectance is likely to provide the most reliable estimate of incident illumination changes. The automatic control of the RGB level of the foreground subject requires a control signal that is proportional to the incident illumination.

Background pixel RGB levels may be added, averaged or selected, e.g. max(RGB), to provide a single number to represent floor luminance.

The floor luminance calculation can be generated in compositing device 9 from the background RGB data provided to compositing device 9. Floor luminance may also be generated by a computer and delivered to the compositing device on the alpha channel.

If the background video is excessively noisy or there are small patterns in the floor, then a running average of pixels (e.g. 16 or more), is used to represent the floor luminance of a given pixel.

In the event the floor consists of a checkerboard of large black and white squares, only the squares whose luminance is above an adjustable threshold are used. The luminance of the preceding white square replaces the luminance of a black square, being below the threshold.

As described in U.S. Pat. No. 5,270,820, it is possible to detect the edge of the subject's alpha silhouette, i.e., matte signal, at the left most edge, the right most edge, the top most edge, (referred to hereafter as the head), and the bottom most edge, (referred to hereafter as the feet). The successive positions of the subject's feet are of interest here, and the pixel address of the feet is established for each field or frame. Each pixel address of the feet on the floor of the blue stage is also the pixel address of the feet in the composited background scene.

The procedure by which the present invention utilizes the floor luminance is as follows. While observing the composite image, the subject is placed in the brightest area on the background floor, where his feet will be at or near the corresponding pixel address having the highest luminance. The operator of the compositing device such as an Ultimatte 9 available from Ultimatte Corporation then adjusts the foreground level controls, while observing a monitor, until the subject appears to be properly illuminated. This foreground level setting is then placed in memory as Control Setting 1.

Next, the subject is placed in a position on the blue stage that appears to be the darkest area of the background. His feet will be at or near the pixel address having the lowest luminance. However, the subject's luminance does not darken. It remains as it was because he is still on a uniformly lighted blue stage. The foreground level controls on the compositing device are then adjusted until the subject's illumination appears to be appropriate for the dark area in the background that he appears to occupy. This second foreground level setting is then placed in memory as Control Setting 2.

The linear conversion from a floor luminance level to a foreground control signal level is performed automatically in the compositing device when the automatic scaling mode is selected.

The RGB levels of the pixels at the subject's feet in the background frame are used to provide floor luminance at this location. The RGB levels also define the color of the floor in addition to its luminance. This color information can be used to influence the color of the foreground subject, simulating the effect of ambient color.

Adding a small fixed amount of the floor color to the foreground RGB modifies the subject color just enough to create an ambience effect. If the amount of added floor color is fixed in a fully illuminated area, then it becomes a larger percentage of apparent subject illumination in darker portions of the background. This is as it should be since the floor luminance becomes a larger portion of the subject's illumination in darker areas.

Backlighting Effect

In some scenes the subject may appear to be illuminated from the back even though the subject is standing on a dark floor. In this case the subject will likely receive more illumination from behind than from the front. The backlight is typically seen as a lighted fringe along the edge of the subject. The color of the backlight will be seen in the fringe of light at the edge of the subject.

The insertion of a fringe at the subject's edge requires selective control of the position and color of the foreground areas to be modified.

When enabled, the backlight effect is generated as follows. The technology described above to determine the position of the subject's feet also determines the position of the top of the subject's head. The luminance of the back wall at the subject's head is compared with the luminance of the floor at the subject's feet. When the luminance at the subject's head is the larger, a black silhouette of the subject (matte signal) is shrunken a few pixels and is used to mask the backlight corrections from affecting the subject, except at its edges.

The subject's foreground level is increased by an amount proportional to the extent that the luminance at the subject's head exceeds the luminance at his feet. Because of the mask, the added backlight is seen only at the edges of the subject. The subject's increased luminance does not occur by simply increasing its RGB levels. It is the RGB colors of the background behind the subject's head that are used to add the effect of backlight.

Since the added backlight consists of the RGB signals of the background, the fringe of light at the edge of the subject will have the color of the background.

The variations of the intensity of the backlight fringe and its color are an automatic function controlled by the lighting conditions found in the background scene.

Other lighting effects can be simulated using the techniques described above.

Figure 3:
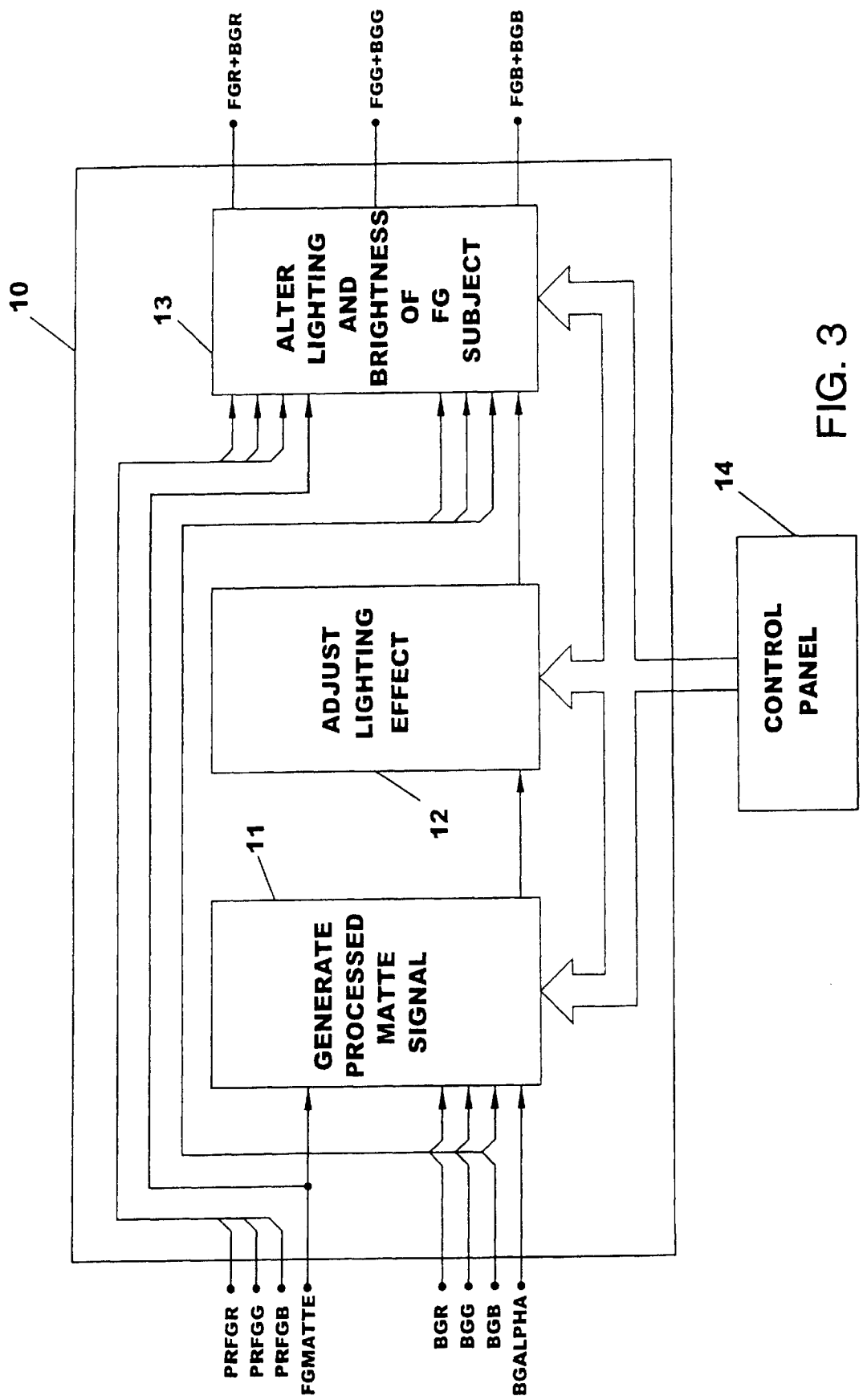
FIG. 3 is a block diagram of one embodiment of this invention.

The following is a detailed description of one embodiment of this invention. Since generation of the matte (key) and processing of the foreground (FG) to remove the backing (screen) is not part of this invention, they will not be discussed in detail. Various techniques of generating a matte (key) and a processed foreground (PRFG) are very well known to persons skilled in the field of 'Blue Screen' image processing. Referring to FIG. 3, the PRFG signals (i.e., PRFGR, PRFGG and PRFGB) represent the RGB values of the FG subject against a black field, where the backing used to exist. The matte represents the level of visibility of the backing, with white indicating full visibility, black indicating no visibility (opaque FG subject), and all shades of gray in between indicating various levels of visibility, including shadows.

The system 10 in FIG. 3 includes three main processing blocks: generate processed matte signal 11, adjust lighting effect 12 and alter lighting and brightness of subject 13. The inputs to the system are the PRFG signals with its matte signal (FGMATTE), the background signal (BG), and the BGALPHA signal (a signal in addition to RGB sometimes used to provide transparency information), if used. The output of the system is FG+BG. All user adjustments are made through a control panel 14, which could be a dedicated hardware unit or a general-purpose computer using dedicated control software, both of which are well known to persons skilled in the field of the invention.

Figure 4:
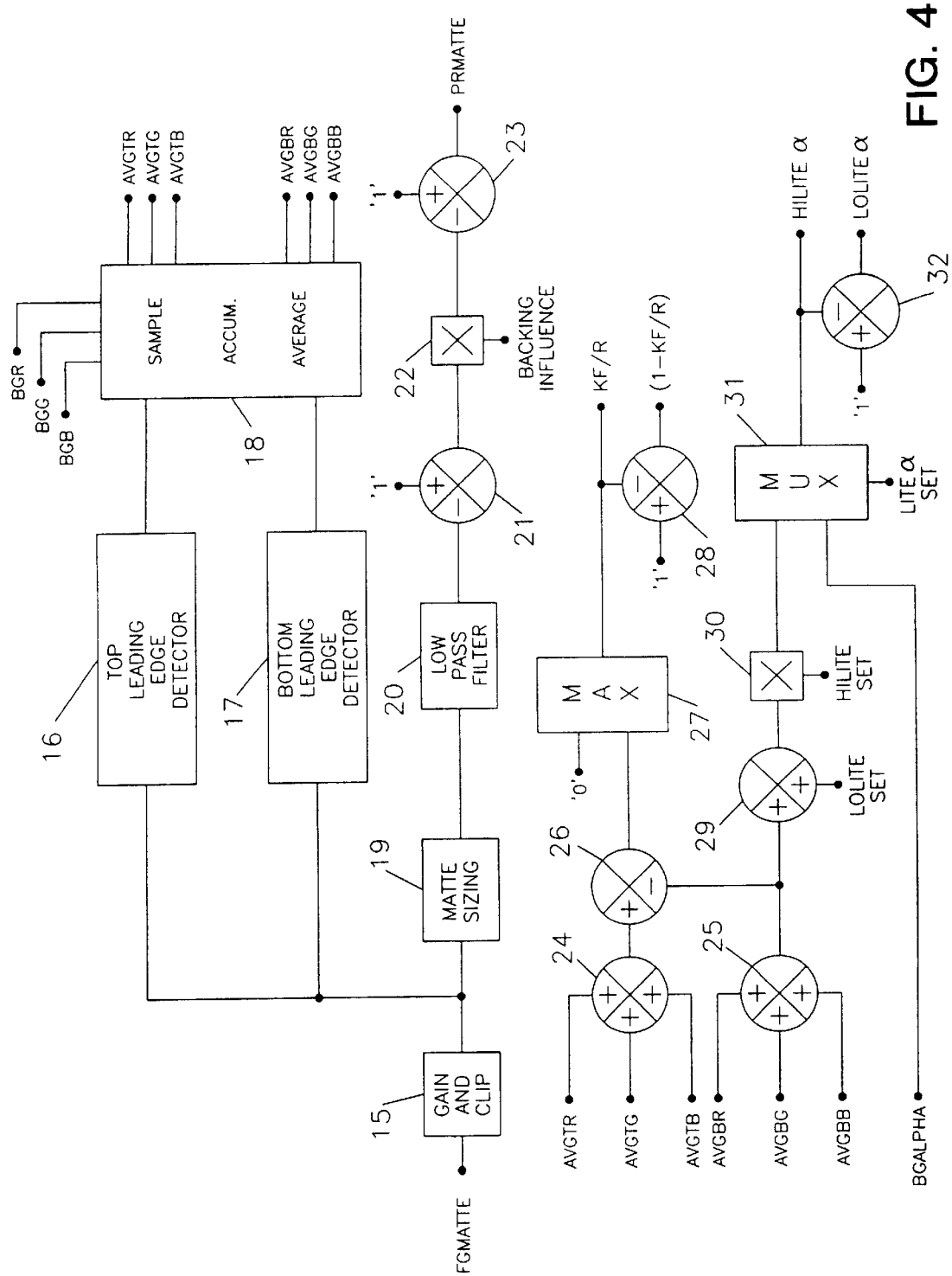
FIG. 4 shows the details of block 11 of FIG. 3.
Figure 5:
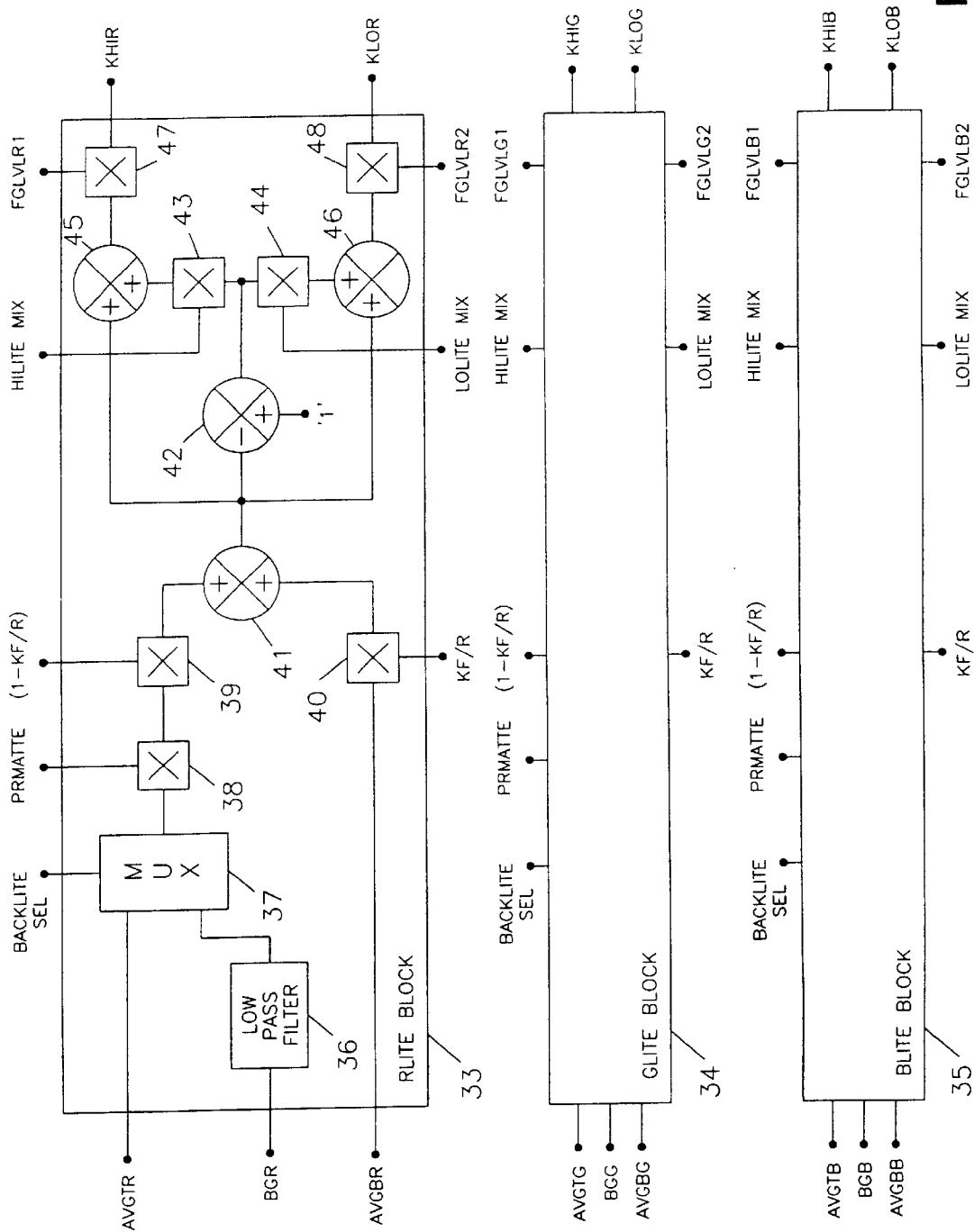
FIG. 5 shows the details of block 12 of FIG. 3.
Figure 6:
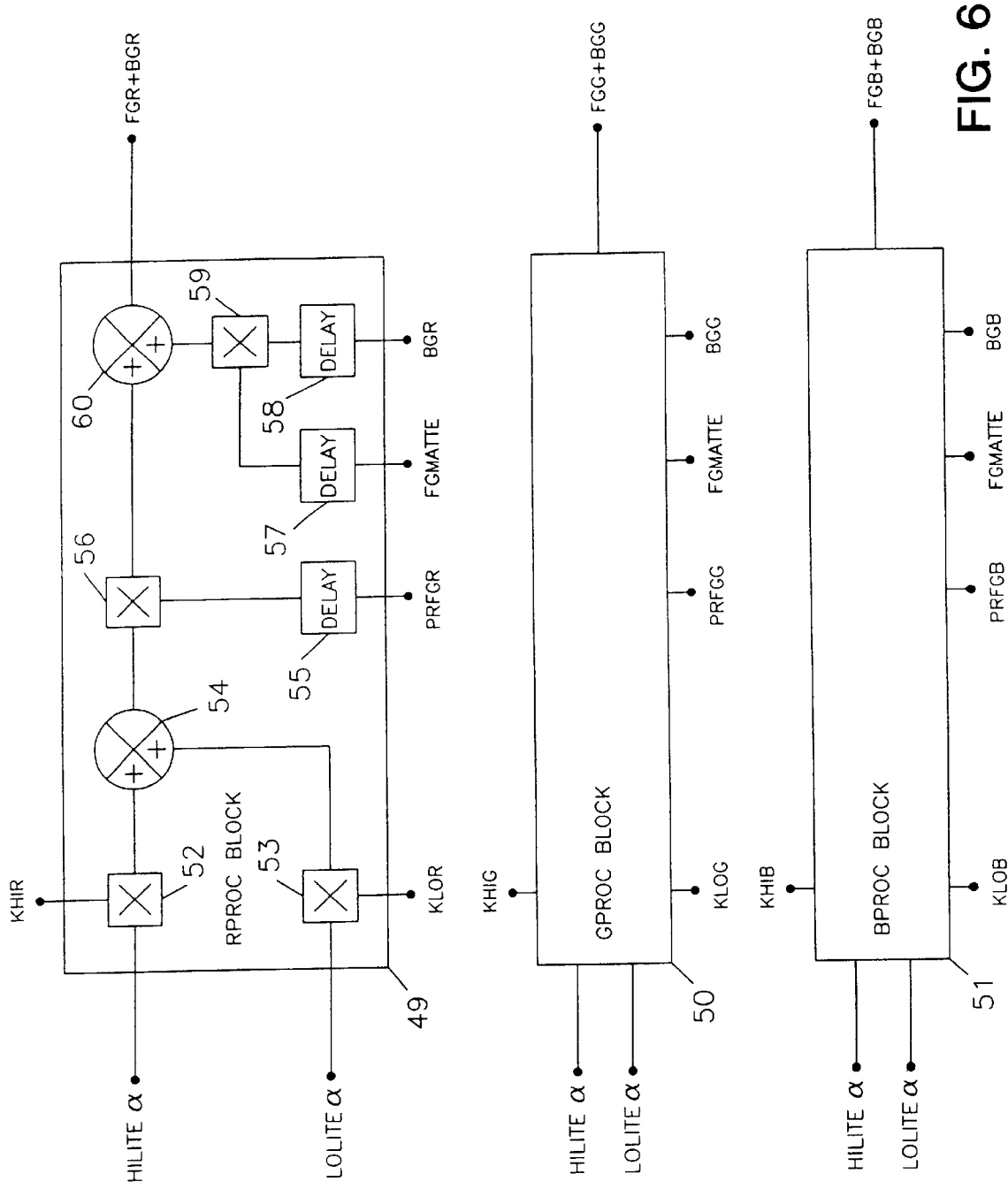
FIG. 6 shows the details of block 13 of FIG. 3.

Details of main processing block 11 are shown in FIG. 4. In this block, the FGMATTE signal is passed through a gain and clip stage 15 to remove most transparency levels of the matte. The gained-up FGMATTE signal is used to identify the top leading edge of the FG subject 16 and the bottom leading edge of the FG subject 17. The top and bottom leading edges are detected by testing each successive scan line, from the top of the image down, for the first occurrence of three adjacent pixels having zero level matte values (opaque FG subject). The position of the detected leading edge occurrence on the first scan line to have such an occurrence is defined as the top leading edge. The position of the detected leading edge occurrence on the last scan line to have such an occurrence is defined as the bottom leading edge. The top leading edge position is used to sample, accumulate and average the values of BGR, BGG, and BGB at and around this position to generate AVGTR, AVGTG, and AVGTB values 18. Similarly, the bottom leading edge position is used to sample, accumulate and average the values of BGR, BGG and BGB at and around this position to generate AVGBR, AVGBG, and AVGBB values 18.

The gained-up FGMATTE signal from gain and clip stage 15 is also connected to matte sizing block 19. In this block the size of the matte is reduced horizontally from both sides, and vertically from top only by an amount set by the operator. The adjusted FGMATTE signal is subjected to a small amount of blur in the low pass filter 20 to smooth out the transitions. An inverted gain stage is added using two subtract circuits 21 and 23 and a multiplier 22 to control the level of the processed matte signal (PRMATTE) from the black end. This PRMATTE is used in block 12 as part of rear lighting setup.

The sum of the sampled and averaged background colors is used to determine the average sampled brightness of the BG signal. The top leading edge averaged samples AVGTR, AVGTG and AVGTB are summed together in the adder 24. Similarly, the bottom leading edge averaged samples AVGBR, AVGBG, and AVGBB are summed together in the adder 25, which is then subtracted 26 from the sum obtained from adder 24. If this difference is larger than zero, it indicates that the source of lighting is behind the FG subject. A zero level clip using a MAX function 27 forces all negative values at its input to become zeros at its output. This output and its inverse 28 are used to control front to rear lighting proportions. The sum of the bottom leading edge averaged samples from adder 25 is an indication of the brightness level of the incident background lighting. With the use of an adder 29 and a multiplier 30, the operator can set a low light reference level and a high light reference level respectively. Alternately, if the BG source has an associated alpha channel (BGALPHA) that indicates the lighting levels of the BG scene, the operator can select that through multiplexer 31. This output and its inverse 32 are used in block 13 as BG lighting level indicators.

Block 12 includes three identical sub-blocks, RLITE block 33, GLITE block 34, and BLITE block 35, each providing the controls needed to adjust the lighting effect for the three FG channels. Since these three blocks are functionally identical, only one channel block will be described in detail.

The first part of RLITE block 33 adjusts the amount of back light red channel contribution to the processed foreground red channel (PRFGR) lighting. The source of the back light red channel could be the averaged red sample at the top leading edge position, AVGTR, or the red channel of the background (BGR), after a small amount of blur has been applied to it 36. The selection is made by the operator using multiplexer 37. The back light red channel is multiplied by PRMATTE 38 to reduce or eliminate the influence of this light on the front of the FG subject, as set by the operator using multiplier 22. A proportional blending of the back light and front light red channels is achieved using multipliers 39 and 40 and adder 41.

When multiplier 43 is set to unity (gain of one) using the HILITE MIX control, the output of adder 41 and its inverse 42 are added 45, and the result is unity. This allows the operator to manually adjust with multiplier 47 using a FGLVLR1 control as part of control setting 1, so that the FG subject will have the correct lighting level when standing in the brightest portion of the BG scene. As HILITE MIX control is adjusted to values less than unity, the output of the adder 41 will have more influence on the lighting of the FG subject standing in the same position in the BG scene. This allows a gradual transition to automatically adjusting the colors of the FG subject.

In a similar manner, when multiplier 44 is set for unity using LOLITE MIX control, the output of adder 41 and its inverse 42 are added 46, and the result is unity. This allows the operator to manually adjust with multiplier 48 using a FGLVLR2 control as part of control setting 2, so that the FG subject will have the correct lighting level when standing in the darkest portion of the BG scene. As the LOLITE MIX control is adjusted by the operator to values less than unity, the output of the adder 41 will have more influence on the lighting of the FG subject standing in the same position in the BG scene. This allows a gradual transition to automatically adjusting the colors of the FG subject.

After generating all necessary signals regarding lighting levels and conditions of the BG scene in block 11 and block 12, these signals are passed to block 13 to alter lighting level and brightness of the FG subject. Block 13 includes three identical sub-blocks, each processing one channel. The red channel is processed in the RPROC block 49, the green channel in the GPROC block 50, and the blue channel in the BPROC block 51. Since these three blocks are functionally identical, only one channel block will be described in detail.

The BG lighting level signal is directly proportional to lighting brightness. When this BG lighting level signal is multiplied by bright lighting adjustment settings, it allows these adjustments to influence the lighting of the FG subject only when the subject is located in the bright areas of the BG scene. The influence of these adjustments will gradually decrease as the FG subject moves to darker areas of the BG scene. By multiplying the inverse BG lighting level signal by low lighting adjustment settings, it will allow these adjustments to influence the lighting of the FG subject only when the subject is located in dark areas of the BG scene. The influence of these adjustments will gradually decrease as the FG subject moves to brighter areas of the BG scene. BG lighting level signal from multiplexer 31 is multiplied 52 by the bright lighting adjustment settings from multiplier 47. The inverse of BG lighting level 32 is multiplied 53 by the low lighting adjustment settings from multiplier 48, then summed 54 with the output of multiplier 52 to become the combined FG red channel lighting signal. The PRFGR channel is delayed 55 to compensate for the processing time of the combined FG red channel lighting signal, then the PRFGR is multiplied 56 by this signal to transfer red channel lighting information to the PRFGR channel. To compensate for the same process delay, the FGMATTE signal and the BGR channel are delayed in delay blocks 57 and 58 respectively, before being multiplied together 59 to become the processed BG red channel (PRBGR). The final red composite output is obtained by adding 60 PRFGR and PRBGR. Similarly, the final green and blue composite outputs are obtained by adding PRFGG and PRBGG and PRFGB and PRBGB, respectively.

We claim:

1. A method for altering RGB signal levels of a foreground subject photographed on a blue stage, so that said subject appears to have been photographed in the illumination environment of a selected background scene, and said RGB signal level alterations are obtained by the following steps:

a) adjusting the RGB signal levels of said subject to provide an initial subjective balance of luminance and color between said subject and said selected background, b) storing background RGB signal levels from a selected zone in close proximity to said subject as background RGB reference signal levels, c) comparing in each successive image frame said stored background RGB reference signal levels with current background RGB signal levels in close proximity to said subject, to determine their RGB variance, d) using said RGB variance to automatically alter said subject RGB signal levels in each successive image frame to maintain a subjective balance between said subject and its background as the subject appears to move throughout said background scene.

2. The method of claim 1 in which said zone from which background RGB reference levels are selected, is an area on the floor adjacent to said subject's feet.

3. The method of claim 2 in which the RGB levels of selected pixels in said area may be added, averaged or selected to provide a single numerical control signal to represent floor luminance.

4. The method of claim 3 in which said control signal is averaged over a number of pixels to reduce the effects of signal noise.

5. The method of claim 4 in which said control signal average is a running average of a group of pixels to minimize the effects of small patterns or background noise.

6. The method of claim 5 in which said control signal when obtained from a light square, on a floor containing large light and dark squares, remains at the value of the light square in floor areas containing a dark square.

7. The method of claim 3 in which said control signal is employed as a multiplier to adjust subject RGB levels of a current frame to maintain a subjective luminance balance between said subject and its background.

8. The method of claim 2 in which an ambient lighting effect is created on the subject by adding a small amount of said background RGB signals to said subject RGB signals.

9. The method of claim 1 in which said initial subjective balance is made in an area of the background scene having the highest floor luminance, and in an area of the background having the lowest floor luminance so as to provide a correction scaling factor.

10. The method of claim 9 in which said scaling factor varies the subject RGB signal levels proportional to changes in floor luminance.

11. The method of claim 1 in which background RGB signal levels of a current frame obtained from a second zone, in close proximity to the top of the subjects head, is compared with said current background RGB levels at the subjects feet and if the background RGB levels at the subjects head is substantially greater than the RGB levels at the subjects feet, then such a strong back light would have created a bright fringe effect at the edge of the subject, and said fringe effect may be approximated by the following steps;

a) generating a matte signal, b) shrinking said matte signal a selected number of pixels, c) softening said matte at its edge to make said edge semitransparent, d) masking said subject with said softened matte to limit corrections controlled by floor luminance from affecting the subject except at its edge, thus creating the bright fringe effect expected from a strong back-light.

12. The method of claim 1 in which the background scene illumination levels are obtained from an alpha channel associated with said background scene.

* * * * *